United States Patent
Stone, Jr.

(10) Patent No.: US 11,990,971 B2
(45) Date of Patent: May 21, 2024

(54) METHOD AND APPARATUS FOR OPTIMIZING OF BEAMFORMING BASED ON USER EXPERIENCE

(71) Applicant: SMARTSKY NETWORKS LLC, Morrisville, NC (US)

(72) Inventor: Ryan Stone, Jr., Charlotte, NC (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 382 days.

(21) Appl. No.: 17/606,918

(22) PCT Filed: Apr. 23, 2020

(86) PCT No.: PCT/US2020/029479
§ 371 (c)(1),
(2) Date: Oct. 27, 2021

(87) PCT Pub. No.: WO2020/223096
PCT Pub. Date: Nov. 5, 2020

(65) Prior Publication Data
US 2022/0209843 A1   Jun. 30, 2022

Related U.S. Application Data

(60) Provisional application No. 62/840,705, filed on Apr. 30, 2019.

(51) Int. Cl.
*H04B 7/06* (2006.01)
*H04B 7/0408* (2017.01)
(Continued)

(52) U.S. Cl.
CPC ......... *H04B 7/0695* (2013.01); *H04B 7/0408* (2013.01); *H04B 7/088* (2013.01);
(Continued)

(58) Field of Classification Search
CPC .... H04B 7/0695; H04B 7/0408; H04B 7/088; H04W 16/28; H04W 36/30; H04W 84/06
See application file for complete search history.

(56) References Cited

U.S. PATENT DOCUMENTS

| 11,483,835 B2 * | 10/2022 | Ryu ..................... H04B 7/0408 |
| 2015/0092676 A1 * | 4/2015 | Periyalwar ............ H04W 76/15 |
| | | 370/329 |

(Continued)

FOREIGN PATENT DOCUMENTS

| WO | 2018127264 A1 | 7/2018 |
| WO | 2019060354 A1 | 3/2019 |

OTHER PUBLICATIONS

International Search Report and Written Opinion of International Application No. PCT/US2020/029479 dated Jul. 31, 2020, all pages cited in its entirety.

*Primary Examiner* — Abdullahi Ahmed
(74) *Attorney, Agent, or Firm* — Burr & Forman LLP

(57) ABSTRACT

A system may include an access network comprising at least two base stations configured to communicate with a wireless communication device via dynamically steerable or formable beams, a resource manager disposed at a location accessible via the access network or at the wireless communication device, and an experience tester configured to determine a qualitative assessment of capabilities of the access network relative to different categories of services or applications for the wireless communication device via a first beam formed or selected to serve the communication device. The resource manager may be configured to initiate a handover based on both location-based criteria and user experience based criteria. The user experience based criteria may be associated with the qualitative assessment.

20 Claims, 9 Drawing Sheets

(51) Int. Cl.
*H04B 7/08* (2006.01)
*H04W 16/28* (2009.01)
*H04W 36/30* (2009.01)
*H04W 84/06* (2009.01)

(52) U.S. Cl.
CPC .......... H04W 16/28 (2013.01); H04W 36/30 (2013.01); *H04W 84/06* (2013.01)

(56) References Cited

U.S. PATENT DOCUMENTS

| | | | |
|---|---|---|---|
| 2015/0304920 A1* | 10/2015 | Cootey | H04W 28/18 |
| | | | 455/436 |
| 2018/0212651 A1* | 7/2018 | Li | H04B 7/0686 |
| 2018/0220317 A1* | 8/2018 | Yilmaz | H04W 24/08 |
| 2019/0306726 A1* | 10/2019 | Mo | H04W 16/28 |
| 2022/0131782 A1* | 4/2022 | Stone | H04W 24/08 |

* cited by examiner

METHOD AND APPARATUS FOR OPTIMIZING OF BEAMFORMING BASED ON USER EXPERIENCE

CROSS REFERENCE TO RELATED APPLICATIONS

This application claims priority to U.S. application No. 62/840,705 filed on Apr. 30, 2019, the entire contents of which are hereby incorporated by reference in its entirety.

TECHNICAL FIELD

Example embodiments generally relate to communication network performance and, more particularly, relate to a system for evaluating network performance and adapting the beamforming capabilities of network to optimize the user experience.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility. However, in spite of the familiarity that people have with remaining continuously connected to networks, people have become equally familiar with the realization that all networks are not created equal in terms of their ability to provide a satisfying user experience.

For example, in certain buildings (e.g., hotels, conference centers, etc.), on airplanes, or in many other contexts, including user's own home networks, slow downloads, latency, disconnections, or various other interruptions or impediments may be experienced. In some cases, although network operators claim high bandwidth and speed capabilities for their networks, the user experience does not match or validate those claims. The disconnect between claimed performance and user experience can sometimes be explained by the fact that all users of a particular network share a given amount of bandwidth. Meanwhile, other networks may have large amounts of bandwidth to offer customers, but poor latency nevertheless ruins the user experience for applications that require a real time interaction of any kind or where high latency or slow return links (especially when compared to a fast forward link from the internet to the device) creates a queuing effect, which can further be exacerbated or caused by slow TCP acknowledgements, data retransmissions, lost or dropped data packets, etc.

With the advent of capabilities for network testing in more robust ways, it may be possible to better understand the capabilities of a particular network to provide a quality user experience. This capability could certainly be helpful in relation to enabling the user or an application developer/provider to set expectations appropriate to the current network's capabilities, or to select an alternative network if such opportunity exists. However, if no opportunity exists for switching to an alternative or higher performing network, it may be desirable to make the user experience a guidepost for setting expectations, improving network performance, or creating and then using a degraded mode of connected operations for applications or services, rather than the more binary connected or offline mode present in many applications or internet provided-services today.

BRIEF SUMMARY OF SOME EXAMPLES

In one example embodiment, a method of conducting user experience-based resource management is provided. The method may include receiving an indication of a qualitative assessment of capabilities of an access network relative to different categories of services or applications for a communication device utilizing the access network via a first beam formed or selected to serve the communication device. The method may further include determining whether a candidate resource exists in response to the qualitative assessment being below a predefined threshold, forming or selecting a second beam associated with the candidate resource in response to determining that the candidate resource exists, and initiating a handover of the communication device from the first beam to the second beam.

In another example embodiment, a resource manager comprising processing circuitry is provided. The processing circuitry may be configured for receiving an indication of a qualitative assessment of capabilities of an access network relative to different categories of services or applications for a communication device utilizing the access network via a first beam formed or selected to serve the communication device, determining whether a candidate resource exists in response to the qualitative assessment being below a predefined threshold, forming or selecting a second beam associated with the candidate resource in response to determining that the candidate resource exists, and initiating a handover of the communication device from the first beam to the second beam.

In another example embodiment, a system may include an access network comprising at least two base stations configured to communicate with a wireless communication device via dynamically steerable or formable beams, a resource manager disposed at a location accessible via the access network or at the wireless communication device, and an experience tester configured to determine a qualitative assessment of capabilities of the access network relative to different categories of services or applications for the wireless communication device via a first beam formed or selected to serve the communication device. The resource manager may be configured to initiate a handover based on both location-based criteria and user experience based criteria. The user experience based criteria may be associated with the qualitative assessment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
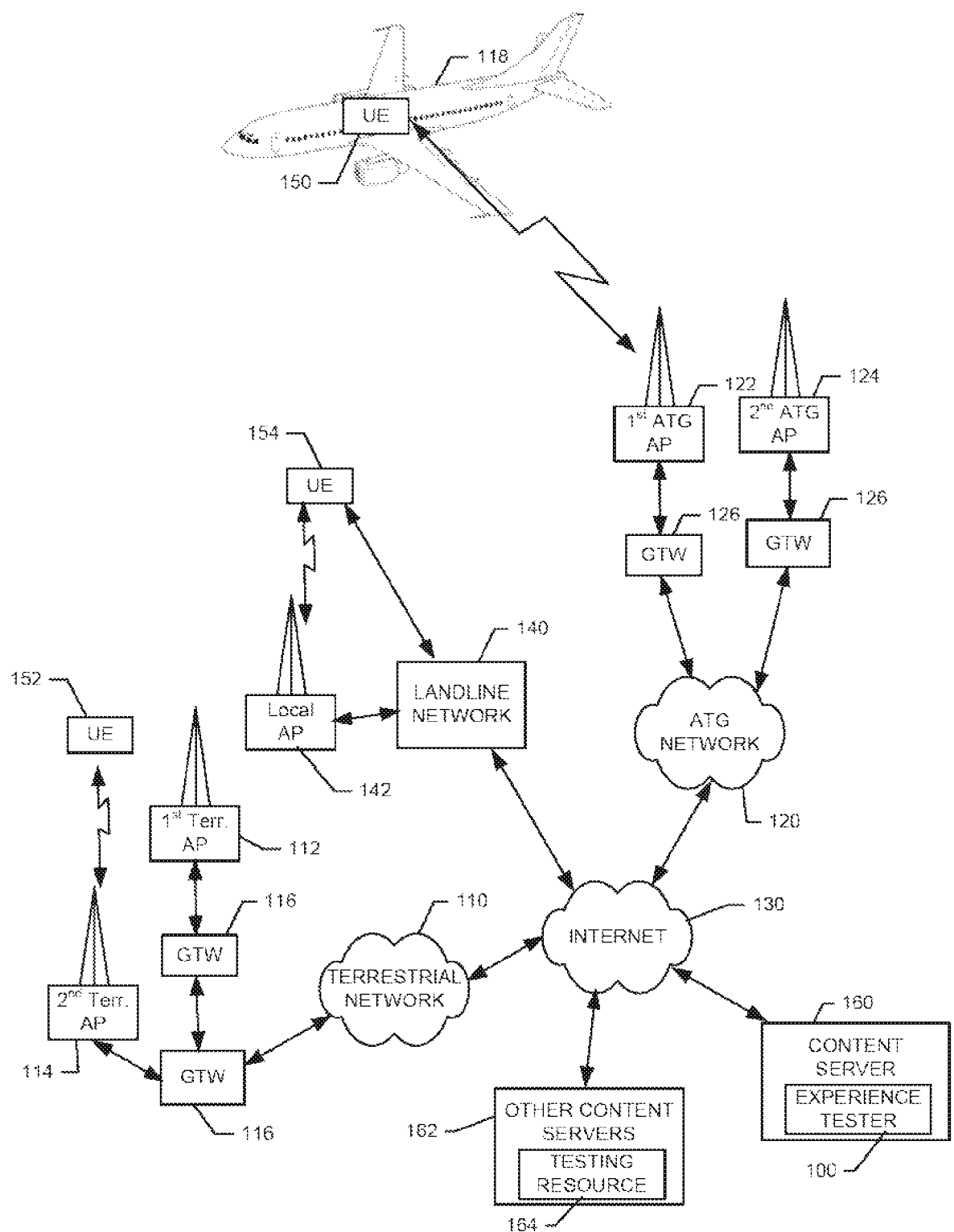
FIG. 1 illustrates a block diagram of a system for providing experience testing in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the terms "data," "content," "information" and similar terms may be used interchangeably to refer to data capable of being transmitted, received and/or stored in accordance with example embodiments. Thus, use of any such terms should not be taken to limit the spirit and scope of example embodiments.

As used in herein, the terms "component," "module," "system," "device" and the like are intended to include a computer-related entity, such as but not limited to hardware, firmware, a combination of hardware and software, or software in execution on some sort of hardware. For example, a component may be, but is not limited to being, a process running on a processor, a processor, an object, an executable, a thread of execution, a program, and/or a computer. By way of example, both an application running on a computing device and/or the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Some example embodiments may provide a network test device or "experience tester" that is configured to conduct a battery of network capability tests that provide quantitative measures of network capabilities for a variety of different types of applications or services. These quantitative measures can then be converted into a useful indication of the quality (i.e., a qualitative assessment) of the user experience that any user of the network might expect for various types of applications or services. In some cases, such as where alternative resources within a given network might be useable to service the user, the qualitative assessment may be used to shift resources to improve the user experience. When certain networks employ beam forming technology, beams could be dynamically steered or selected to maximize, or at least provide a minimum quality level for the user experience.

Thus, for example, if the network employs beam steering and resource contention is detected (or determined to exist) on a current (or original) beam serving a user (and other users), the resource contention may reduce the quality of the user experience for everyone sharing the resource (i.e., the original beam) at that time. According to an example embodiment, another (i.e., new) beam may be dynamically formed and/or steered to reduce the resource contention issue and improve the user experience for users served by the original beam and the new beam. Similarly, if the network employs a plurality of selectable but otherwise fixed beams having different respective orientations/coverage areas and resource contention is detected (or determined to exist) on an original beam, an example embodiment may be employed to dynamically select another beam to reduce the resource contention issue and improve the user experience for users served by the original beam and the new beam.

Of note, the new beam may be formed from the same or a different origin (i.e., base station or satellite) in various different embodiments, as will be discussed in greater detail below. Moreover, the new beam could be used to shift existing users from the original beam, or the new beam may only be used for subsequent users added after a particular threshold quality of user experience is exceeded, or the new beam could be used for connections requiring certain characteristics unavailable on the first beam due to constraints associated with loading, latency, or bandwidth (forward or return link). Thus, for example, the paradigm for serving users with the new resource could either be to create a new resource and split existing users (evenly or unevenly (e.g., based on priority)) between the old and new resource (i.e., the original beam and the new beam), or the new beam may only be used to serve subsequent new users that are added in the same region after the threshold for quality of user experience has been reached, which quality might be dependent upon the type of application being used relative to the characteristics of the connectivity needed to optimally support said application.

As noted above, the formation, steering or selection of a new beam (or resource) is based at least in part on a qualitative assessment of the user experience. Thus, of note, the balancing or manipulation of network resources in example embodiments is not triggered or otherwise managed based on arbitrary assessments of the numbers of users on a resource or other purely numerical information that purport to provide an indication of network performance. As discussed above, these purely numerical metrics or quantitative assessments can often provide significantly misleading results that suggest network quality that cannot be correlated to the actual user experience. Accordingly, as a starting point, some example embodiments may first be configured to provide a useful way by which to determine the quality of the user experience. In particular, some example embodiments may be configured to employ a battery of quantitative test metrics that, when combined and correlated to ratings indicative of user experience when the corresponding combination of quantitative metrics exist together on a network, can provide a qualitative assessment of network performance indicative of the quality of the user experience. Various thresholds or triggers associated with the quality of the user experience may then be used to manage the application of network resources in order to maintain certain goals for the quality of the user experience on the network. For example, additional serving beams may be formed, selected or steered to serve assets in a particular part of the network where user experience seems to be suffering at any given time. Thus, it should be appreciated that the user experience can be used as a basis for determining when to add new resources (i.e., beams), and the new resources could be added as a substitute for current resources, or to augment or share the load with current resources. Thus, for example, there may or may not necessarily be a handover when contention is detected, but instead the augmentation of resource capabilities (i.e., by adding more resources) from either the same source or a different source. The sources that can be used can therefore be beams that may each have their own (potentially different) characteristics depending upon if the beams are related to ATG or Satellite, and further based on the type of satellite (LEO, MEO, GEO, frequency band, bandwidth, etc.), so that any combination of resources can be employed to improve user experience.

Although example embodiments may operate with qualitative assessment information obtained by any means, one particular and non-limiting example of how to obtain qualitative assessment information will be described below. In this regard, some example embodiments may employ an "experience tester" to obtain the qualitative assessment information. The experience tester, as the name implies, may provide a useful indicator regarding how the user will experience the network for each of a plurality of different types of services for which the network may be used. The indicator may therefore be thought of as a qualitative assessment of the network's capabilities with respect to each category or type of service. From a practical perspective, the experience tester may be used to provide a comprehensive indication of network capabilities that can be used by the user (e.g., to let a user who plans to use a web service or application of a particular type or category determine whether or not the access network the user is currently on will provide a good experience to the user for the web service or application in question), by applications (e.g., to enable applications to warn users of a potential poor experience or to operate in a mode that fits the capabilities of the network to maximize the user experience), or by the network (e.g., to manage resources of the network to improve or otherwise manage the quality of the user experience). In the first example, where the user consumes the qualitative assessment, the user can therefore be equipped to make decisions about whether the currently available access network is suitable to any web applications or services the user plans to utilize. In the second example, applications or services may find the experience tester to be useful in selecting modes of operation for working with the user based on the capabilities of the user's access network. In the third example, network resources may be used to manage network efficiency and user experience by dynamically creating or removing individual network resources (e.g., beams) based on current user experience levels at various points within the network. Moreover, through the collection of many experience tests over time, which might be centralized or accomplished in the cloud, statistically significant comparisons can be enabled with respect to specific locations in the network in order to more objectively compare connectivity, whether the network is wired or wireless or a combination, even in the absence of the test itself but by virtue of merely knowing where within the network a user is located at a given time.

FIG. 1 illustrates an example layout of a system in which any one or more of multiple different types of networks can be tested by a network test device or experience tester 100 of an example embodiment. As shown in FIG. 1, the experience tester 100 may operate in connection with a plurality of different types of networks including both wired networks and wireless networks. In this regard, examples of wireless networks shown in FIG. 1 include a terrestrial network 110 (e.g., a 4G, 5G, LTE or other such network) and an air-to-ground (ATG) network 120. However, it should be appreciated that other wireless communication networks, including satellite communication networks, may also be tested in accordance with example embodiments.

As shown in FIG. 1, each of the wireless networks may include wireless access points (APs) that include antennas configured for wireless communication. Thus, for example, the terrestrial network 110 may include a first terrestrial AP 112 and a second terrestrial AP 114, each of which may be base stations, among a plurality of geographically distributed base stations that combine to define the coverage area for the terrestrial network 110. The first and second terrestrial APs 112 and 114 may each be in communication with the terrestrial network 110 via a gateway (GTW) device 116. The terrestrial network 110 may further be in communication with a wide area network such as the Internet 130, Virtual Private Networks (VPNs) or other communication networks. In some embodiments, the terrestrial network 110 may include or otherwise be coupled to a packet-switched core or other telecommunications network.

The ATG network 120 may similarly include a first ATG AP 122 and a second ATG AP 124, each of which may be base stations, among a plurality of geographically distributed base stations that combine to define the coverage area for the ATG network 120. The first and second ATG APs 122 and 124 may each be in communication with the ATG network 120 via a GTW device 126. The ATG network 120 may also be in communication with a wide area network such as the Internet 130, VPNs or other communication networks. In some embodiments, the ATG network 120 may also include or otherwise be coupled to a packet-switched core or other telecommunications network.

Each access point of the terrestrial network 110 and the ATG network 120 may have a wired (or wireless) backhaul connection to its respective wireless network to allow access thereto for the wireless communications devices (e.g., user equipment (UE) 150 and UE 152) connected with the corresponding access points. Moreover, the access points can be provided via cellular towers or other tower structures (as in the depicted example), rooftops or other structures (e.g. building facades, church steeples, billboards, etc. . . . ) having wireless communication infrastructure, mobile vehicles and vessels, and/or the like. Furthermore, in existing wireless networks, it is to be appreciated that some cells defined by the access points may overlap or completely encompass one another, and/or coverage gaps may exist between some cells. To the extent example embodiments are practiced in connection with satellite networks, the APs may be individual satellites.

A landline network 140 is also shown in FIG. 1 as an example of a wired network, and is capable of being tested via example embodiments. The landline network may be an example of a local area network (LAN), a metropolitan area network (MAN), a wide area network (WAN) or any other network that can be operably coupled to the Internet 130 by electrical, optical or any other wired or cabled coupling means.

For UE 150, which is located on an aircraft 118, the UE 150 may be operably coupled to the APs of the ATG network 120 either directly or via an access point located on the aircraft 118. Meanwhile, UE 152 may be directly connected to the APs of the terrestrial network 110. Finally, UE 154 may be operably coupled to the landline network 140 either directly via a wired connection (e.g., Ethernet and/or the like), or indirectly via a local AP 142 that may use a short-range wireless communication protocol such as, for example, Bluetooth or WiFi. Of note, the UEs 150, 152 and 154 could each be examples of separate UEs used by corresponding separate users and devices (e.g., cell phones, lap top computers, tablets, desktop computers, etc.). Thus, each of the UEs shown, and possibly other UEs as well, can access the experience tester 100 simultaneously or in series.

As shown in FIG. 1, the experience tester 100 may be located at a content server 160 accessible from any of the access networks (e.g., the terrestrial network 110, the ATG network 120, the landline network 140, a satellite network, etc.) via the Internet 130. In this regard, any number of other content servers 162 may also be accessible via the Internet 130, and the UEs 150, 152, and 154 may be utilizing their respective access networks to access the services, applications, information, and/or the like that are located at various ones of the content servers 162 via the Internet 130. Moreover, in some cases, services or applications that may be available via the Internet 130 at various ones of the other content servers 162 may include one or more examples of a testing resource 164. Each instance of the testing resource 164 may be a unique network testing tool configured to test the speed, bandwidth, or various other aspects of network performance. The testing resource 164 may also or alternatively be configured to resolve various information about the access network that a given one of the UEs 150, 152, and 154 is currently using to access the Internet 130.

Accordingly, based on the structure described above, it should be appreciated that a user of any one of the UEs such as, for example, the UE 150, may be enabled to utilize its respective access network (e.g., the ATG network 120) to access the experience tester 100 via the Internet 130. As will be discussed in greater detail below, the experience tester 100 may be configured to call one or more instances of the testing resource 164, and potentially also implement local resources, to conduct information gathering and network testing information to provide a qualitative network assessment to the UE 150 regarding the ATG network 120. However, as can be appreciated from the descriptions above, a qualitative network assessment could be generated also or alternatively for each and every other access network via which a user reaches out to the experience tester 100 for assistance.

Figure 2:
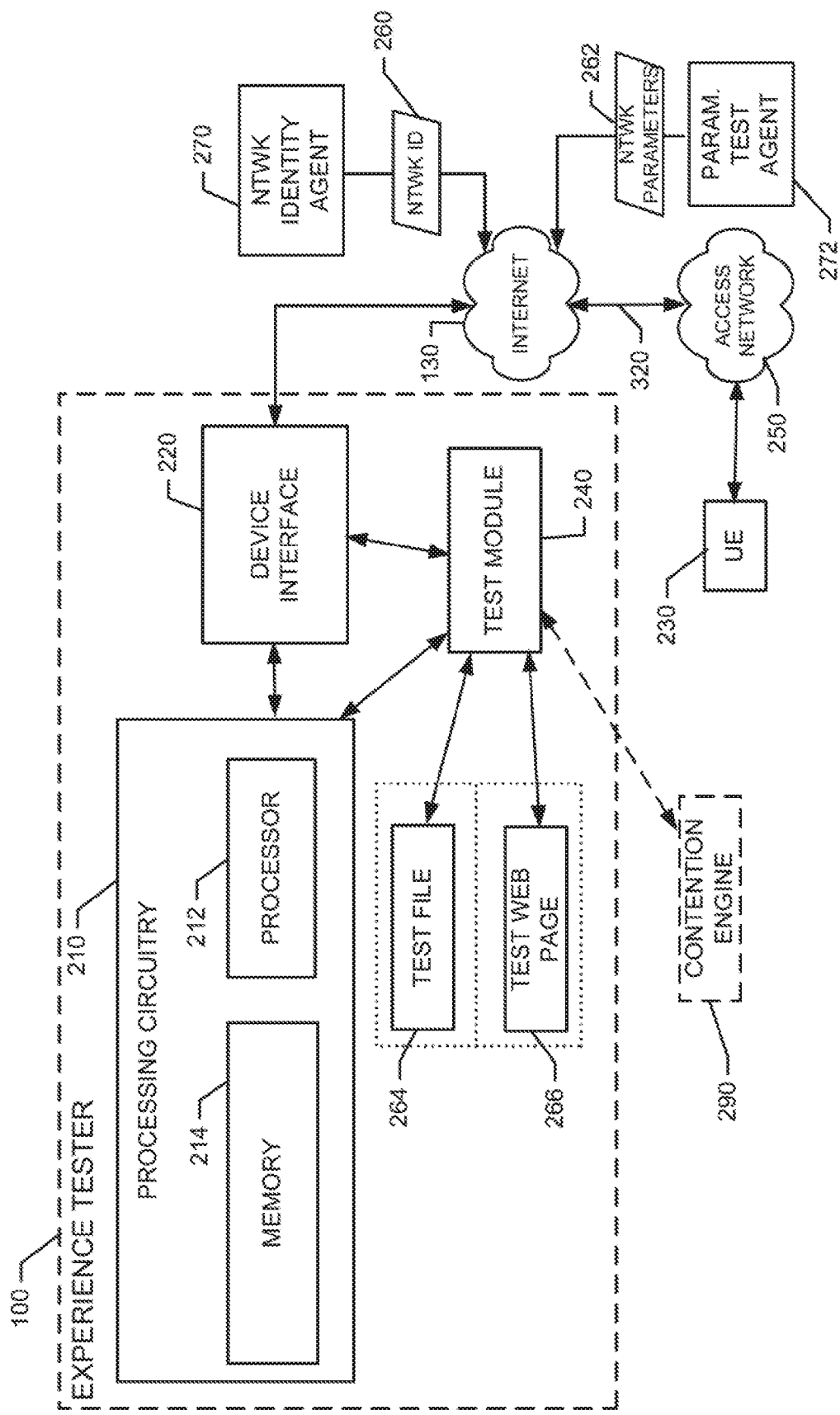
FIG. 2 illustrates a block diagram of an experience tester according to an example embodiment.

FIG. 2 illustrates a functional block diagram of the experience tester 100 of an example embodiment. In this regard, the experience tester 100 may include processing circuitry 210 configured to perform the tasks, operations and/or functions of the experience tester 100 as described herein. As such, the processing circuitry 210 may be configured to perform data processing, control function execution and/or other processing and management services according to an example embodiment of the present invention. In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a device interface 220. As such, the processing circuitry 210 may be embodied as a circuit chip (e.g., an integrated circuit chip) configured (e.g., with hardware, software or a combination of hardware and software) to perform operations described herein.

The experience tester 100 of FIG. 2 does not show a user interface. However, UE 230 of FIG. 2 (which is an example of any of the UEs of FIG. 1) may include the user interface. In this regard, the test module 240 of the experience tester 100 may interface with the browser of the UE 230 to generate control consoles, web pages and/or interface elements on the screen of the UE 230 to act as the user interface.

The device interface 220 may include one or more interface mechanisms for enabling communication with other devices, both internal and external to the experience tester 100. Thus, for example, internal modules or components and external modules, entities, web sites, devices and/or the like may all be communicated with via the device interface 220. In some cases, the device interface 220 may be any means such as a device or circuitry embodied in either hardware, or a combination of hardware and software that is configured to receive and/or transmit data from/to modules, entities, components, networks, web sites, applications, etc., that are in communication with the processing circuitry 210.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the operation of the test module 240 based on inputs received by the processing circuitry 210 and/or entities, services or applications called to evaluate network performance of an access network 250 that is being evaluated by the experience tester 100. As such, in some embodiments, the processor 212 (or the processing circuitry 210)

may be said to cause each of the operations described in connection with the test module 240 in relation to generation of requests for, and processing of responses including, information associated with the qualitative performance of the access network 250 responsive to execution of instructions or algorithms configuring the processor 212 (or processing circuitry 210) accordingly. In particular, the instructions may include instructions for obtaining either or both of network identification information 260 and network parameters 262 based on calls to assets accessible via the Internet 130. The network identification information 260 and network parameters 262 may then be useable by the test module 240 along with measurement of performance for download and upload of a test file 264 and a test web page 266 for providing the qualitative assessment of network performance as described herein.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the processing circuitry 210 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 214 may include one or more databases that may store a variety of data sets responsive to input sensors and components. Among the contents of the memory 214, applications and/or instructions may be stored for execution by the processor 212 in order to carry out the functionality associated with each respective application/instruction. In some cases, the applications may include instructions for controlling operation of the text module 240 as described herein.

In an example embodiment, the UE 230 may access the Internet 130 via access network 250 (e.g., (e.g., the terrestrial network 110, the ATG network 120, the landline network 140, or a satellite network, etc.). The UE 230 may type in a web address associated with the experience tester 100 and a web page may be displayed that enables the user to test the performance of the access network 250 using the experience tester 100. In some embodiments, the user may initially launch operation of the experience tester 100 by requesting the experience tester 100 to detect the access network 250. The test module 240 may be configured to receive the request for network detection and initiate a call to a network identity agent 270. In this regard, for example, the test module 240 may use an application programming interface (API) for an entity (e.g., ipinfo.io) associated with the network identity agent 270 and that is capable of determining the network identification information 260. The network identification information 260 may include, for example, the user's public IP address, host name, city, region, country, and/or other data uniquely identifying the access network 250. The test module 240 may then be configured to, if possible, identify the connectivity solution associated with the access network 250 (e.g., the name of the network provider). If the name of the network provider can be determined, the test module 240 may log the name and all measurement data associated with conduct of the test along with the date, time and any other pertinent information (e.g., user location). The log may be provided in the memory 214, or in a separate memory location either at or accessible to the experience tester 100. If the name of the network provider cannot be determined, the test module 240 may request such information from the user. If the user provides a name of the network provider, again the log may record the name along with all measurement data. If no name can be determined, the log may record the name as unknown, or may record the measurement data in association with the remaining network identification information 260 obtained by the test module 240.

In some embodiments, particularly for ATG networks, satellite networks or similar services that can serve aircraft (e.g., aircraft 118), a separate request may be provided to the user by the test module 240 to request that the user indicate a tail number or flight number of the aircraft 118. In some cases, the tail number of the aircraft 118 may be associated with a particular network provider and/or other detailed information about the communications equipment associated with the aircraft 118 may be known. However, in other examples, the test module 240 may be able to automatically detect tail number information as well based on the network identification information 260, IP address, router MAC address or other means that may associate the network provider with an aircraft. Of note, in contexts not associated with aircraft, the tail number can be omitted completely.

After initial network detection and user entry of the name of the network provider and/or tail number information (if applicable), the user may select an option to continue the test. The test module 240 will then prepare to execute a battery of test activities, and commence execution of the battery of test activities when ready. In this regard, for example, the test module 240 may provide an indication that it is preparing to run the test to the user while making an API call to another test site (e.g., parameter test agent 272) in order to obtain ping test, jitter test and/or download speed information from another publicly available resource (e.g., another example of the testing resource 164). In a typical situation, the ping test, jitter test and/or download/upload speed information obtained from the testing resource 164 would likely be the end of the test. For example, the test module 240 would display the results of the test (e.g., a ping test result, a jitter test result, and/or a download or upload speed result) as the network parameters 262 to the user as the final output of the test. However, as noted above, this information (i.e., the network parameters 262 in their raw form) is often either not conducive to interpretation in a meaningful way as to what the user experience will be, is not meaningful individually but rather in combination with the other parameters, or the information is simply not applicable to the particular service or application the user intends to employ (i.e. a slow return link may not be crucial to conducting one-way streaming services where the forward 'download' speed is more relevant, albeit streaming services may start slowly if latency is high). Accordingly, the test module 240 does not stop at this point, but continues to add other tests to the battery of test activities in order to get a more meaningful and useful result. In particular, the test module 240 may utilize still other testing resources 164 to get a more comprehensive result than simply employing the ping test, the jitter test, and/or the download and upload speed test.

In an example embodiment, the test module 240 may then be configured to download the test file 264 to the UE 230, and the download time may be measured and recorded. The test file 264 may be a file of a predetermined size (e.g., 1 MB) and may be at a predetermined location for the test module 240. In some cases, the test file 264 could be located with the test module 240 locally (e.g., at the memory 214). However, in other cases, it may be desirable to have the test file 264 stored at a remote location to further test the access network 250 in relation to accessing a file from another external server via the Internet 130. Thus, the test file 264 could be either locally or remotely stored with respect to the test module 240.

Thereafter, the same test file 264 may be uploaded from the UE 230 back to the experience tester 100 and the upload time may be measured and recorded. Thus, the test module 240 may have an accurate representation of the download and upload speeds for a known file that is standard across all network tests. The recordation of the times can not only identify situations where there is a significant imbalance between download and upload speeds, which could impact the user experience for services or applications that require fast speeds in both directions, but can also be used to compare either the same or different network performance results either at different times or with other distinguishing characteristics that may be determinable over time.

After the download and upload testing is completed, the test module 240 may be configured to direct the UE 230 to download a predetermined web page (i.e., the test web page 266) at a specified location. However, the test web page 266 may further include images that are located on different servers. In an example embodiment, the test web page 266 may have a predetermined size (e.g., 2 MB) and may have custom selected images that are on at least two different servers, and sometimes more than two servers (e.g., four servers). The requirement to access a known web page that includes images from multiple servers further tests the robustness of the capabilities of the access network 250 in a standard way, but not as monolithic as simply accessing a single web page with content found at a single server which is really abnormal in the context of how most webpages are constructed, pulling in components from a variety of different locations as various portions of the webpage are populated with content ranging from the desired information, analytics plug ins, advertising, and other links or services. Thus, the test web page 266 provides more meaningful testing of the user experience than conventional testing would, or could.

After downloading the test web page 266, the test module 240 may execute a social media download test with the UE 230. In this regard, since social media and certain other applications or services may require performance that involves more burst-type data exchanges, the test module 240 may direct the UE 230 to download a specific number of packets of a specific size and measure the download speed. For example, the experience tester 100 (i.e., via the test module 240) may direct the download and upload of eight 50 KB packets (for a total of 400 KB in each direction) while measuring and then recording download and upload speed of smaller amounts of data representative.

Accordingly, in some embodiments, the battery of tests described above may include any or all of a network identification information test, a network parameters test, a standard file download and upload test, a web page download test, and a social media download. Once all of the tests have been completed, the test module 240 may be configured to compute and generate results of the testing. The results of the testing may be generated by determining a score or rating for the performance of the access network 250 in relation to each of a plurality of different services or capabilities the user may expect the access network to deliver. In an example embodiment, the different capabilities or services may include voice calling, video calling, streaming entertainment, social media, gaming and web browsing. A total testing time (i.e., the total time for completion of all of the tests) may also be provided along with any other data that may be of interest to the user. For example, results of the ping test, the download speed, upload speed, website loading speed, and/or the like may be displayed. In some cases, an overall score may also be provided.

As such, the user may be presented with a summary of which functions the connection provided by the access network 250 supports, and to what degree. In other words, a qualitative assessment of network performance will be provided to the user in a way that relates network performance to specific media applications or services that are commonly used by various users. The user may therefore not just receive data that is not provided in any useful or meaningful context to the lay person. Instead, the user may receive meaningful results that are specifically presented in a way that is intuitive to understand, and that also reflects the way the user is likely to feel about the performance of the network when the network is used.

Although not required, some example embodiments may further include a contention engine 290. The contention engine 290 is shown in dashed lines in FIG. 2 in order to illustrate its optional nature. However, the contention engine 290 is also shown in dashed lines to indicate that its location within the system can be different in respective different embodiments. In this regard, the contention engine 290 could be accessed by the test module 240 via the Internet 130, or may be a local resource in some cases. Thus, although FIG. 2 shows a direct connection from the test module 240 to the contention engine 290, the connection may either be direct or indirect in various embodiments. Moreover, in some cases, the content engine 290 may be an online application or resource that can be called for input by the test module 240.

In any case, the contention engine 290 may be configured to determine resource contention (e.g., a contention ratio) for the access network 250 when requested by the test module 240. The contention engine 290 may be configured to sensor or otherwise determine the number of connected devices at a given access point. The command to sense or determine resource contention may occur automatically due to operation of the test module 240, or may be requested manually by the operator or initiated by changing settings of the test module 240 to add the determination of resource contention as part of the methods described herein. This method of resource contention determination may be conducted "internally."

However, in some cases, the contention engine 290 may be configured to determine resource contention "externally." External resource contention determination may be accomplished based on information or knowledge regarding network structure and the locations of various assets within the network structure. In this regard, for example, in cases where the access network 250 is the ATG network 120 or a satellite network, the information of knowledge of network structure may include information indicating specific beam coverage parameters. For example, databases may be provided to define satellite beamwidth and general geographic coverage areas for each satellite and each beam thereof at any given time, which could include the location of both fixed and steerable beams. Similarly, ATG base station locations, the beams associated with each ATG base station, and the coverage areas of each beam may also be known or recorded. Aircraft location (or the location of other system assets) may then be compared to the known information about network structure in order to determine how many aircraft (or users on the aircraft) are sharing a beam at any given time. This can then be used to determine resource contention. Thus, external resource contention determination may fuse aircraft (or other asset) location/position information (e.g., from ADS-B or other sources), databases of which aircraft are equipped with in-flight connectivity equipment, databases of satellite or ATG beam inventory, information indicating which airlines have contracts with suppliers and which bands of communications signals the aircraft (or other assets) is equipped to receive, and/or any other useful information in order to figure out how many aircraft (or assets) are being served by the same beam, satellite or tower at any given (current or future) time. The contention engine 290 may then report the resource contention information to the test module 240, and the test module 240 may determine a score for contention, and the impact of contention on the user experience.

As mentioned above, the test module 240 may be configured to generate a score or rating for network performance in relation to separate capabilities. The scoring may be accomplished based on actual experience of users. In this regard, for example, selected ones of the test battery results may be used for determining a score for individual ones of the capabilities that are rated. The selected results are those results that are pertinent, or most pertinent, to the corresponding capability. Thus, a selected test result from the battery of tests is only used in connection with determining the score for the respective capabilities with which the selected test result has relevance. Once a set of relevant test results is associated with each individual one of the capabilities, the boundaries between different rating levels are determined. Network testing was then performed by a group of testers and feedback from the testers is used to validate or modify the boundaries. For example, if the voice calling capability of a particular network was scored such that, based on predefined boundaries, the voice calling capability would receive a highly positive rating, the user feedback from the tester (or at least a predetermined number or percentage of testers) may either validate the predefined boundary or suggest that the predefined boundary should be adjusted to exclude the score received from getting the highly positive rating.

Figure 3A:
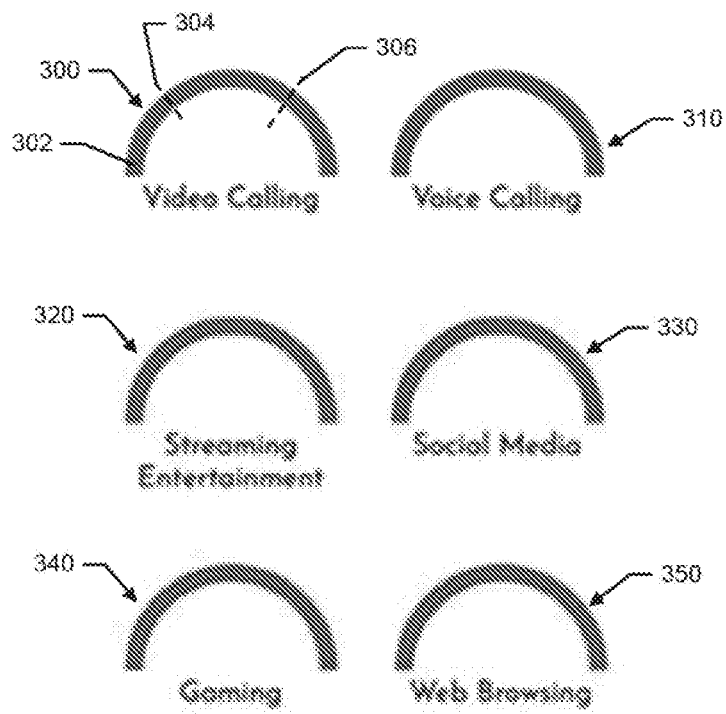
FIGS. 3A and 3B illustrate respective displays of results generated by the experience tester according to an example embodiment.
Figure 3B:
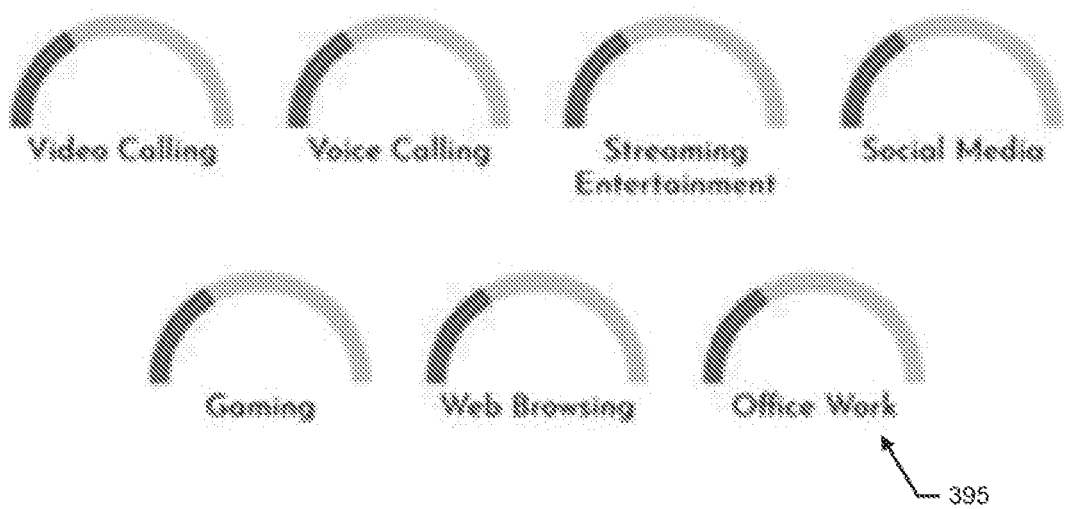

The scoring may result in ratings that are tied to an intuitive experience indicator such as, for example, an emoji (e.g., a smiley face, sad face, or the like). Another intuitive experience indicator may be a scale, bar graph or container that shows a degree of fullness to represent the rating or quality. Color (e.g., green, yellow or red) may also be implemented to provide an intuitive experience indicator. Moreover, combinations of the above listed intuitive experience indicators may be employed in some examples. FIGS. 3A and 3B each example results from operation of the experience tester 100. In this regard, FIG. 3A illustrates an example of a results page for testing of a particular access network that received a fully positive report. Meanwhile, FIG. 3B illustrates results from a legacy ATG network as of the filing of this application, and the results are poor in every category, particularly due to the lack of a quality return link and high latency.

Referring now to FIG. 3A, the results web page generated at the UE 230 are shown. As mentioned above, an intuitive experience indicator is provided for each of a plurality of capabilities of the access network 250. These indicators include a video calling indicator 300, a voice calling indicator 310, a streaming entertainment indicator 320, a social media indicator 330, a gaming indicator 340, and a web browsing indicator 350. As the name suggests, the video calling indicator 300 provides a qualitative assessment of the capability of the access network 250 for conducting video calls. In this example, the intuitive experience indicator 302 associated with the video calling indicator 300 is a half circle shaped scale that provides a color coded and degree of fullness indication to the user regarding network capability. Thus, given that the scale is full and the color is green, the intuitive experience indicator 302 of this example indicates that the access network 250 will provide a good user experience to a user engaged in a video call. Of note, the scale may have regions indicated by boundaries 304 and 306. If the scale is full below boundary 304, a red color may be generated for the intuitive experience indicator 302. Meanwhile, if the scale is full at a level between boundary 304 and 306, a yellow color may be generated for the intuitive experience indicator 302. If the scale is full at a level above boundary 306, then a green color may be generated for the intuitive experience indicator 302. As such, the intuitive experience indicator 302 may, in some cases, be generated to include at least two intuitively determinable indications of experiential quality (e.g., color and scale fullness) to reinforce the qualitative nature of the result, and further distinguish the result from a mere number or numerical rating that has little or no significance to a lay person. In this regard, for example, the color may generally indicate the quality of experience (e.g., good, bad or average), and the scale fullness may provide an indication of numerical score, which is a further measure of the degree of the quality of experience.

Similarly, the voice calling indicator 310, the streaming entertainment indicator 320, the social media indicator 330, the gaming indicator 340, and the web browsing indicator 350 may each generate a colored and scaled output for an intuitive experience indicator. However, an overall performance indicator 360 may also be generated for the access network 250 by the test module 240. In this regard, the overall performance indicator 360 may also include an emoji 362 (which may further be color coded) and/or a verbal rating (e.g., "optimal performance," "poor performance," or "average performance").

In some example embodiments, a total testing time 370 may also be displayed. The total testing time 370 may provide an indication of the delays or latency associated with the access network 250, and thus, the total testing time 370 may be a useful indicator of quality in its own right. Other numerical results 380 may also be provided for the user to review. However, as noted above, these results are often not as useful to the lay person when they are not provided with some context. Thus, some embodiments may record these values, but present a rating for user viewing that instead utilizes an intuitive experience indicator for these values as well. FIG. 3B also illustrates one skipped test 390, which indicates that the experience tester 100 need not necessarily complete (or even attempt) every test. In this regard, in some cases, network performance may be so poor (or test resources may not be available in the case of servers used for storing test data content being temporarily offline) that certain tests cannot be completed within a predetermined time limit. If so, those tests may be skipped, and in some cases, other tests may also be skipped as a result of a prior skipped test due to anticipation that the subsequent test will not be completed if the prior test could not be completed. Of note, FIG. 3B also adds an additional type of media (i.e., office work 395) score to illustrate the fact that other testing criteria can be utilized in addition to those described above. The office work 395 type may relate to connections to the cloud or corporate servers, VPNs, sending and receiving large email files with attachments, uploading or downloading files from corporate or cloud servers, etc.

As noted above, each separate category (or capability) has its own scoring formula that is based on the metrics or parameters captured during the execution of the battery of tests. The specifics of those scoring formulas are outside of the scope of this disclosure. However, it should be appreciated that each different category may rely on different combinations of quantitative measurements and have different ranges and/or weightings for the importance or valuation of the measurements or combinations.

As noted above, the test module 240 may record all of the scoring results in association with the network identification information 260. The scoring results may also include date and time information and, in some cases, location information for the UE 230. By storing past scoring results along with the network identification information 260, trend and/or historical data for a given access network, location, date/time, etc., can be generated by the test module 240. The trend or historical data can be provided to the user for comparison purposes (i.e., to see how performance today compares to average performance for the access network 250 at similar dates/times, for assets at similar locations, etc.) Thus, the user may sometimes be able to appreciate that the access network 250 is having a "good," "bad," or "average" day in terms of performance. Moreover, in some cases, users (or applications) can simply refer to historical data without actually running a new experience test in order to make determinations regarding their current or planned usage of the access network 250. Thus, for example, a user (or an automated application) with multiple network options can review results for candidate networks (even prospectively and in advance of travel) to determine the likely best plan for optimizing connectivity during travel (either currently or in the future).

In some cases, users may utilize a particular web application or service whose performance depends at least in part (and sometimes to a large degree) on the corresponding performance of the access network 250 for the category (e.g., media type) of service or application being used. In these situations, it is possible for the web application or service to appear to be of poor design, quality or performance when the culprit making the web application or service look bad is actually the underlying access network. Accordingly, in addition (or as an alternative) to operating as described above in response to a UE 250 going to a website associated with the experience tester 100 and launching the battery of tests to consume the results by appreciating which categories of service (e.g., media types) will provide corresponding levels of quality in terms of user experience, the experience tester 100 could operate in other ways. For example, web services or applications may themselves initiate a call to the experience tester 100 in order to evaluate the access network 250 of a particular user attempting to use the web service or application.

In examples where the web service or application calls the experience tester 100, the battery of tests discussed above may be run without any specific user interaction. However, the experience tester 100 may provide an indication of network performance to the web service or application regarding the performance of the access network 250 associated with the particular user. The web service or application may do any of a number of things with this information. For example, in some cases, the web service or application may provide an unsolicited indication to the user to indicate the quality of the access network 250. This may be preemptive measure to let the user know the quality of their access network in order to set expectations for the user regarding the likely performance of the access network 250 and therefore potentially also the performance of the web service or application. In this regard, if the web service or application is a game, the gaming score may be provided by the test module 240 (with or without other scores), and the web service or application being launched by the user may proactively indicate that the user's network has been detected and the user experience for playing the game on this network will be a correspondingly rated level. For example, the game may provide an indication to the user that "your network has been detected and you can expect a [good or bad] experience based on your network's gaming capabilities." Using trend/historical data, the game could further provide suggestions regarding ways to improve performance or avoid poor performance such as, "please try a different network for optimal game performance," or "playing the game from hours xxxx to yyyy may result in degraded game performance on your network."

In some cases, web services or applications may further be configured to adjust service or performance characteristics based on the scoring results provided by the experience tester 100. For example, if the access network 250 grades highly (either for all categories, or at least for the category to which the web service or application belongs), the web service or application may automatically maximize certain parameters (e.g., video fidelity, image quality, or other settings). Meanwhile, if the access network 250 grades poorly (either for all categories, or at least for the category to which the web service or application belongs), the web service or application may automatically reduce or minimize certain parameters (e.g., video fidelity, image quality, or other settings). Accordingly, network capability-adaptive web services and/or applications may be provided that automatically adapt their performance to network performance based on the information provided by the experience tester 100. In some cases, the adaptation may be related to a mode of operation of the web service or application. For example, the web service or application may operate in a degraded mode, an offline mode, a normal mode, a fully optimized mode, and/or the like, based on the qualitative scoring of the access network 250, as determined by the experience tester 100.

Figure 4:
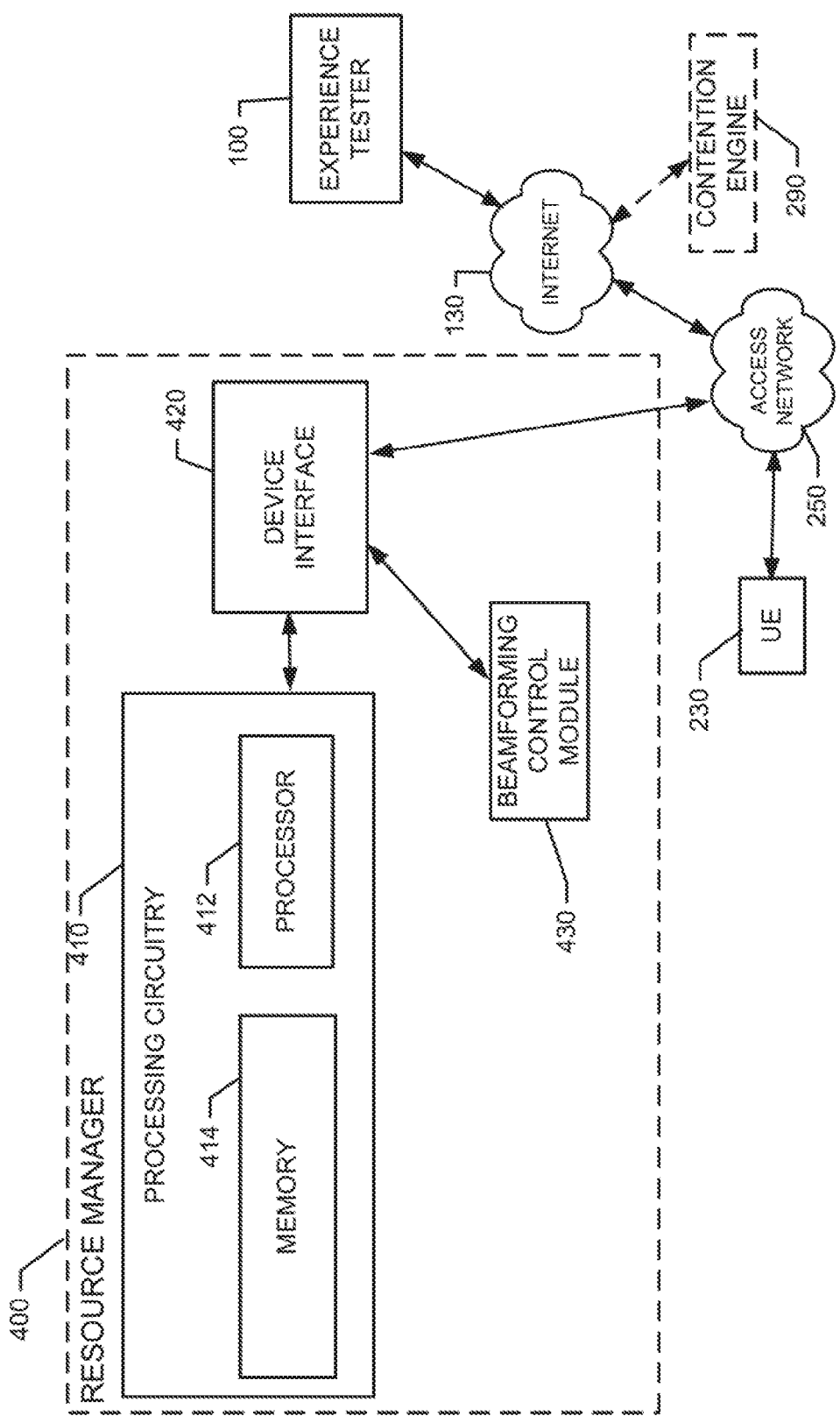
FIG. 4 illustrates a block diagram of a resource manager according to an example embodiment.

With respect to modification of network resources for the access network 250, FIG. 4 illustrates a block diagram of a resource manager 400 that may be configured accordingly. As shown in FIG. 4, the resource manager 400 may include processing circuitry 410 configured to provide control outputs for various entities, modules or components of the access network 250 to control specific aspects of network operation or performance. The processing circuitry 410 may be configured to perform data processing, control function execution and/or other processing and management services according to an example embodiment of the present invention. In some embodiments, the processing circuitry 410 may be embodied as a chip or chip set. In other words, the processing circuitry 410 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 410 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 410 may include one or more instances of a processor 412 and memory 414 that may be in communication with or otherwise control a device interface 420. As such, the processing circuitry 410 may be embodied as a circuit chip (e.g., an integrated circuit chip) configured (e.g., with hardware, software or a combination of hardware and software) to perform operations described herein.

The device interface 420 may include one or more interface mechanisms for enabling communication with other devices (e.g., modules, entities, sensors and/or other components of the access network 250). In some cases, the device interface 420 may be any means such as a device or circuitry embodied in either hardware, or a combination of hardware and software that is configured to receive and/or transmit data from/to modules, entities, sensors and/or other components of the access network 250 that are in communication with the processing circuitry 410.

The processor 412 may be embodied in a number of different ways. For example, the processor 412 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 412 may be configured to execute instructions stored in the memory 414 or otherwise accessible to the processor 412. As such, whether configured by hardware or by a combination of hardware and software, the processor 412 may represent an entity (e.g., physically embodied in circuitry—in the form of processing circuitry 410) capable of performing operations according to embodiments of the present invention while configured accordingly. Thus, for example, when the processor 412 is embodied as an ASIC, FPGA or the like, the processor 412 may be specifically configured hardware for conducting the operations described herein. Alternatively, as another example, when the processor 412 is embodied as an executor of software instructions, the instructions may specifically configure the processor 412 to perform the operations described herein.

In an example embodiment, the processor 412 (or the processing circuitry 410) may be embodied as, include or otherwise control the operation of the beamforming control module 300 based on inputs received by the processing circuitry 410 responsive to receipt of position information associated with various relative positions of the communicating elements of the network. As such, in some embodiments, the processor 412 (or the processing circuitry 410) may be said to cause each of the operations described in connection with the beamforming control module 430 in relation to adjustments to be made to antenna arrays to undertake the corresponding functionalities relating to beamforming responsive to execution of instructions or algorithms configuring the processor 412 (or processing circuitry 410) accordingly. In particular, the instructions may include instructions for processing 3D position information of a potentially moving receiving station (e.g., on an aircraft, train, car, or other vehicle, or in the possession of a user) can be used to determine relative position of the receiving station to any or all of the fixed transmission sites (i.e., the APs of the access network 250) in order to instruct an antenna array to form or select a beam in a direction that will facilitate establishing a communication link between the moving receiving station and one of the fixed transmission stations as described herein.

In an exemplary embodiment, the memory 414 may include one or more non-transitory memory devices such as, for example, volatile and/or non-volatile memory that may be either fixed or removable. The memory 414 may be configured to store information, data, applications, instructions or the like for enabling the processing circuitry 410 to carry out various functions in accordance with exemplary embodiments of the present invention. For example, the memory 414 could be configured to buffer input data for processing by the processor 412. Additionally or alternatively, the memory 414 could be configured to store instructions for execution by the processor 412. As yet another alternative, the memory 414 may include one or more databases that may store a variety of data sets responsive to input sensors and components. Among the contents of the memory 414, applications and/or instructions may be stored for execution by the processor 412 in order to carry out the functionality associated with each respective application/instruction. In some cases, the applications may include instructions for providing inputs to control operation of the beamforming control module 430 as described herein.

In an example embodiment, the beamforming control module 430 may be configured to enable beams to be formed or selected from various components of the access network 250 (e.g., the APs of whatever type of network the access network 250 is embodied as) toward the UE 230 or toward radio equipment that ultimately communicates with the UE 230. Thus, in the context of the ATG network 120 of FIG. 1, the beamforming control module 430 may control the formation or selection of beams from either or both of the first ATG AP 122 or the second ATG AP 124 toward the aircraft 118 (and the UE 150 located thereon). The beams may be formed and/or selected in real-time or in advance to anticipate a handover. In either case, the beamforming control module 430 may be configured to utilize information indicative of a relative location of the aircraft 118 or UE 150 to the first ATG AP 122 and/or the second ATG AP 124. By knowing the locations of two devices or network nodes and determining where the devices or network nodes are relative to one another from the perspective of either one of the devices or network nodes, steering can accurately be accomplished. Tracking algorithms may also be employed by the beamforming control module 430 or another component operably coupled thereto in order to track dynamic position changes and/or calculate future positions based on current location and rate and direction of movement. After the expected relative position is determined, the beamforming control module 430 may be configured to provide instructions to direct formation or selection of a beam from an antenna array of the corresponding one of the first ATG AP 122 or the second ATG AP 124 based on the expected relative position. The instructions may be provided to a control device that is configured to adjust characteristics of an antenna array to form directionally steerable beams steered in the direction of the expected relative position or to form a selected one of a plurality of fixed beams that each have different orientations, but combine to cover a sector or region with adjacent and slightly overlapping coverage areas. Such beams may, for example, have azimuth and elevation angle widths of 8 degrees or less. Moreover, in some cases, such steerable beams may have azimuth and elevation angle widths of 5 degrees or less, or even 2 degrees or less. However, larger sized steerable beams may also be employed in some embodiments.

As shown in FIG. 4, for a generic example of the access network 250 serving the UE 230, any or all of the user of the UE 230, an application being launched at the UE 230, or the resource manager 400 may be configured to initiate a call to the experience tester 100 to determine a qualitative assessment of capabilities of the access network 250. Specifically when the resource manager 400 initiates the call, the experience tester 100 may provide the qualitative assessment to the resource manager 400. The qualitative assessment provided to the resource manager 400 may be based at least in part on a contention score, or other information indicative of resource contention provided by the contention engine 290 in some cases. However, in other cases, the contention score or information indicative of resource contention could be provided directly to the resource manager 400 for use thereby in connection with operation of the beamforming control module 430. In some cases, the resource manager 400 may be configured to also (or alternatively) receive reports on experience test results obtained by UEs or applications that run experience tests. Thus, the resource manager 400 may, in some cases, never actually run its own experience test. However, the resource manager 400 could still execute various network control functions on the basis of experience test results that have been reported to the resource manager 400 may various other users or applications within the access network 250.

In an example embodiment, the resource manager 400 may be configured to periodically call the experience tester 100 to test operation of the access network 250 at the corresponding time of the call. As such, periodic testing of the access network 250 may be accomplished at routine time intervals set by network operators. Additionally or alternatively, calls to the experience tester 100 may be made each time a new user is added to the network or, in some cases, when a threshold number of users have been added (i.e., have attached) to the access network 250. When thresholds are employed, the threshold numbers of users could be determined on a network or resource level, or even based on geography. For example, the resource manager 400 may be configured to make a call to the experience tester 100 each time a threshold number of users have attached to a single AP, a single sector of an AP, or to a single beam. Alternatively or additionally, the resource manager 400 may be configured to make a call to the experience tester 100 each time a threshold number of users have attached to the access network 250 from a particular geographic location or region (e.g., including a group of APs).

Regardless of the frequency of making calls, or whether the resource manager 400 receives experience test data without actually making calls itself, when the resource manager 400 receives results of an experience test (i.e., a qualitative assessment of network capabilities relative to delivery of a quality user experience based on a combination of quantitative factors scored according to results of actual human perceptions of performance at the corresponding combinations of quantitative factor scores), the resource manager 400 may make a determination regarding adjustment of network operating parameters in order to improve user experience at locations within the access network 250 that are receiving low qualitative assessments.

Of note, in some cases, the resource manager 400 may have access to (via communication with) testing locations fixed within the access network 250 at various locations. Each test location may include a test UE or similar device that actually makes the call from the corresponding location within the access network 250. The results can then inform the resource manager 400 of network capabilities within the particular location of the corresponding test UE. This can include test UEs on aircraft or satellites within ATG or satellite networks. However, in many cases, it may be simpler for the resource manager 400 to simply request or passively receive experience test results from UEs or applications that are in the access network 250 at their various locations rather than utilize fixed test UEs.

Upon receipt of the results of an experience test, the resource manager 400 may be configured to determine a location or resource identifier associated with the experience test. For example, if the UE 150 on the aircraft 118 of FIG. 1 performed the experience test and reported results to the resource manager 400, then the resource manager 400 may be configured to determine the serving AP for the UE 150 (e.g., the first ATG AP 122). If the results of the experience test demonstrate poor user experience, or at least a suboptimal user experience, the resource manager 400 may be configured to determine whether any available options exist to improve the user experience. As such, for example, the resource manager 400 may consider existing information of previously completed experience tests associated with candidate resources (along with the date and time that such experience tests were completed to confirm relevance to the present time) to determine whether a better performing resource can be shifted to. Additionally or alternatively, the resource manager 400 may request a test UE or another device to conduct an experience test associated with an alternate resource to determine suitability for shifting to the alternate resource based on results of the experience test associated with the alternate resource. As yet another alternative or additional option, a new resource presumed to be capable of improving the user experience may be brought online.

Accordingly, for example, if a beam serving the UE 150 of the aircraft 118 is producing experience test results that are poor (and/or resource contention that is high), the resource manager 400 may determine whether another beam (originating from the same or a different AP) can be shifted to cover the UE 150 or can be formed to serve the UE 150. The new beam may be selected based on recent superior performance for assets in the area, or simply as a means by which to reduce resource contention. In some cases, after forming or steering the new beam, the resource manager 400 may be further configured to perform another (e.g., confirmatory) experience test to validate the improvement in user experience and/or reduction in resource contention associated with the new beam.

Figure 5:
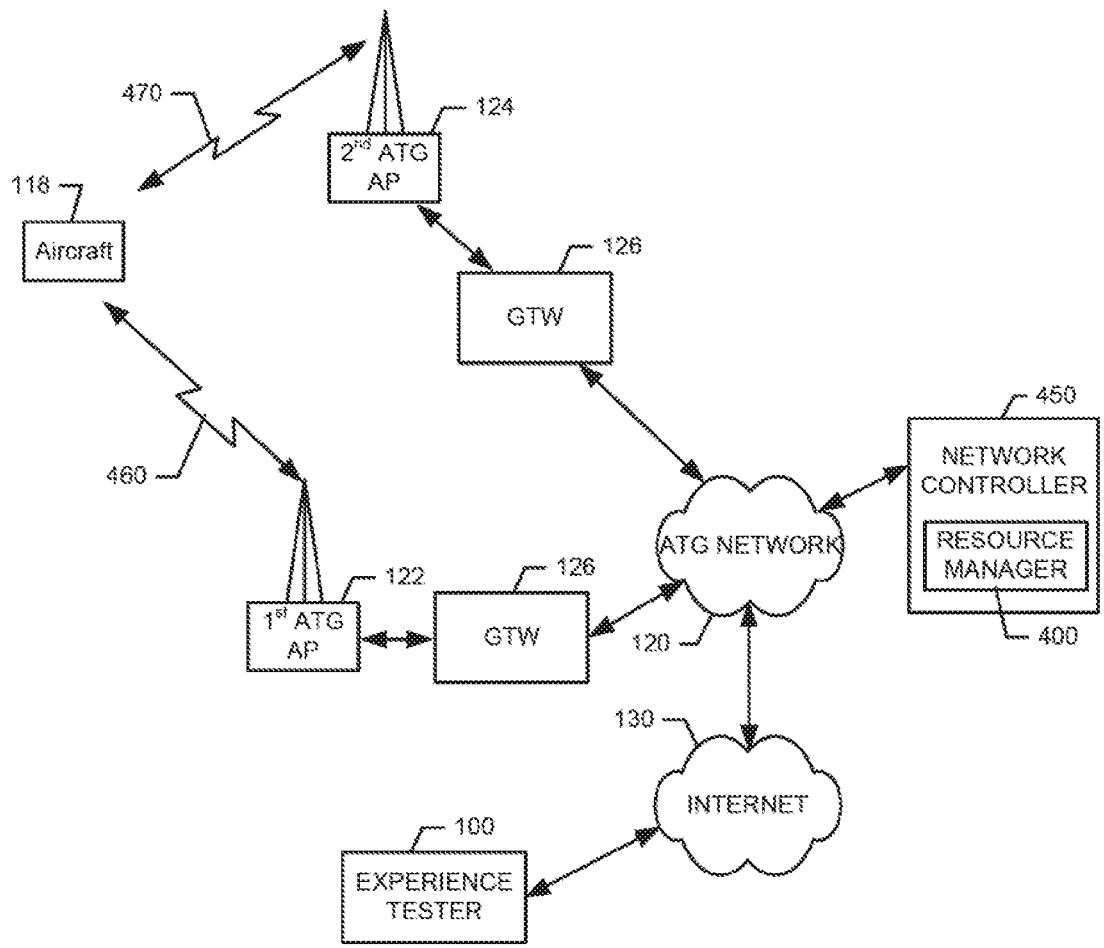
FIG. 5 illustrates a block diagram of an ATG network of the system of FIG. 1 configured to employ the resource manager of FIG. 4 in accordance with an example embodiment.

FIG. 5 illustrates a block diagram of the ATG network 120 of the system of FIG. 1 configured for operation as described above. In this regard, the resource manager 400 is disposed at a network controller 450 of the ATG network 120, and the aircraft 118 is initially in communication with the first ATG AP 122 via a first beam 460. In some cases, the network controller 450 may be configured to handle routing calls to and from the aircraft 118 (or to communication equipment on the aircraft 118 or other devices in other networks) and/or handle other data or communication transfers between the communication equipment on the aircraft 118 and the ATG network 120. In some embodiments, the network controller 450 may function to provide a connection to landline trunks when the communication equipment on the aircraft 118 is involved in a call. In addition, the network controller 450 may be configured for controlling the forwarding of messages and/or data to and from UEs or other communication equipment, and may also control the forwarding of messages for the base stations or APs.

Of note, the first beam 460 may be a steerable beam that can be dynamically steered to track movement of the aircraft 118 based on 3D position information. However, in other cases, the first beam 460 could be one of a series of fixed beams that can be formed and handed over to adjacent other fixed beams that are sequentially selected for handover and tracking of the aircraft 118 based on 3D position information. In either case, the experience tester 100 may determine a poor user experience for a user (e.g., a UE or other equipment) or application on the aircraft 118. Either based on a prior (within a predetermined time period) or contemporaneously executed experience test associated with the second ATG AP 124, or based on an assumption that another beam will improve user experience, the resource manager 400 may make a determination to form a second beam 470 to the aircraft 470. The second beam 470 may be similar in structure to the first beam 460 (but could be different). After the second beam 470 is formed and some or all of the UEs or other equipment on the aircraft 118 are handed over to the second beam 470, a confirmatory experience test may be conducted by the experience tester 100 to confirm the improvement in user experience that was expected.

If the improvement is validated by equal or better experience testing results, the second beam 470 may continue to carry all of the assets transferred thereto until another handover is required and executed (e.g., by the network controller 450). If the improvement is not validated, another experience-based handover may be determined by the resource manager 400. The next handover may be executed either due to an invalidated experience-based handover, a subsequent reduction in experience test results below a threshold value (e.g., generally or for a given media type), or based on conventional handover triggers (e.g., signal strength reduction, location based handover, etc.). It should be appreciated that the example of FIG. 5 could be duplicated for any other network including terrestrial networks, satellite networks, etc.

Figure 6:
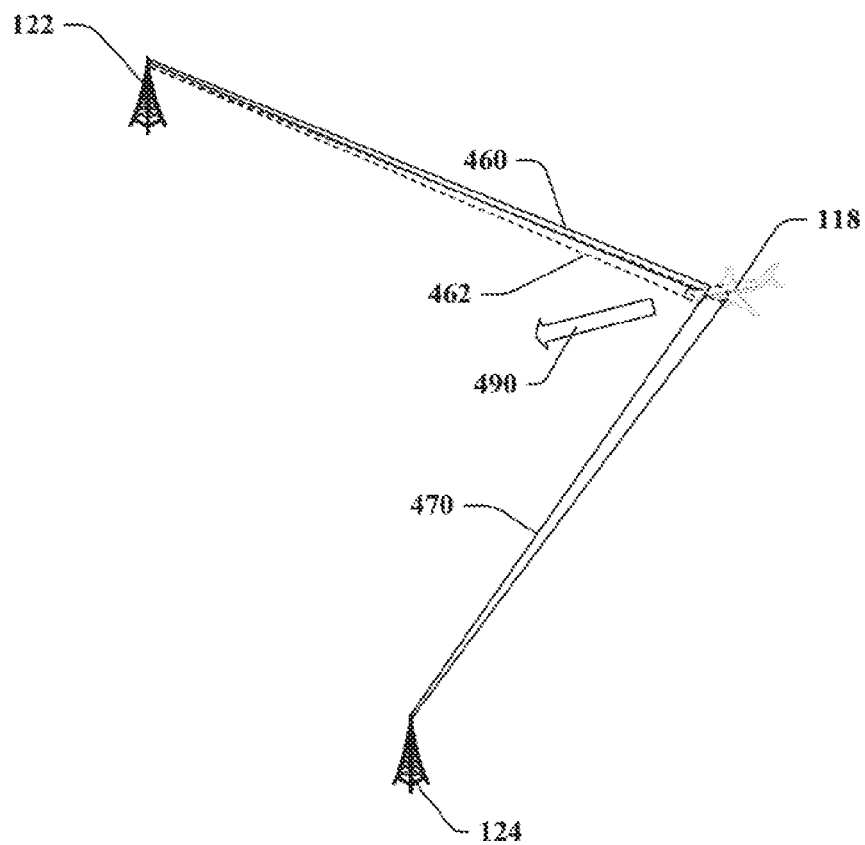
FIG. 6 illustrates formation of a candidate resource for user experience-based handover in accordance with an example embodiment.

FIG. 6 illustrates the first and second beams 460 and 470 in greater detail to demonstrate the nature of the beams (e.g., "pencil beams") that can be employed in some cases. In this regard, the first and second beams 460 and 470 may have a beamwidth in both azimuth and elevation angle that is less than about 8 degrees. However, in some cases, beamwidths may be as small as 5 degrees or even 2 degrees. As the aircraft 118 moves in the direction of arrow 490, the first beam 460 (and/or the second beam 470) may be steered to follow or track that aircraft 118 based on 3D position information. Alternatively, as discussed above, an adjacent and at least partially overlapping beam (e.g., beam 462) may be selected and/or formed, and other beams may continue to be selected and/or formed in sequence to continue to handover and maintain communications with the aircraft 118 as it moves in the direction of arrow 490. These beam handovers occur based on location or position of the aircraft 118, and may be conducted routinely by the network controller 450 to account for aircraft 118 movement. However, the formation, selection and/or steering of beams based on user experience improvement may be conducted by the network controller 450 (e.g., specifically by the resource manager 400) in parallel with the location-based handovers in order to improve overall network performance and user experience. Thus, the network controller 450 (e.g., via the resource manager 400) may be configured to conduct beam handovers based on both location-based criteria and user experience based criteria.

Figure 7:
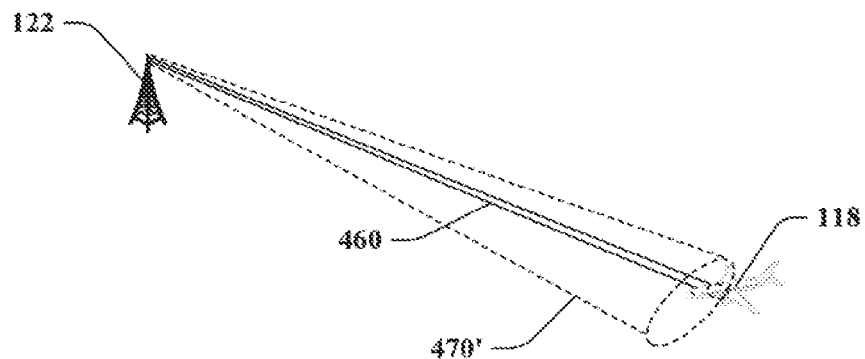
FIG. 7 illustrates an alternative paradigm for formation of a candidate resource for user experience-based handover in accordance with an example embodiment.

It should be appreciated that the handover from the first beam 460 to the second beam 470 assumes that two APs are in range to communicate with the aircraft 118. In situations where only one AP is in communication range (or where one AP is the best candidate for generating both the first beam 460 and a subsequent beam), example embodiments could still be practiced if, for example, the first ATG AP 122 is capable of generating one or more additional beams on another channel (e.g., employing another frequency). In this regard, as shown in FIG. 7, an alternate second beam 470' could be originated from the same AP as the first beam 460 (i.e., from the first ATG AP 122 in this example) using a different channel resource. The second beam 470' may have a wider (or narrower) beamwidth than the first beam 460 and may, in some cases, be generated from another antenna array associated with the ATG network 120 and disposed at the first ATG AP 122. Thus, beam selection or formation may be optimized to dynamically steer beams or select beam sources (depending on the capability exists on a given network) to switch from a highly contended beam to one with lower contention, thereby improving the user experience for users of both beams. In some cases, user experience-based beam optimization may also be application specific such that the optimization works in conjunction with a local access point (e.g., a cabin wireless access point (CWAP) on an aircraft, or a WiFi router in a home or business) to make the system even more intelligent by routing traffic not just based on application type and priority, but also by virtue of experience and contention issues. Example embodiments may therefore provide a combination/dependency-based intelligence that is missing in all traditional testing methods.

Although the resource manager 400 is shown at the network controller 450 in FIG. 5, it should be appreciated that individual instances of the resource manager 400 could also function at respective entities or platforms within any given access network in some cases. Thus, for example, the aircraft 118 could have a separate instance of the resource manager 400 thereon. In such an example, the resource manager 400 could operate as described above except that the initiation of handover could come from the aircraft 118 side instead of the network side. In such a case, the aircraft 118 (or communication equipment thereon such as the aircraft radio suite) may direct formation of a second beam to be directed/selected to form a second or alternate resource for communication with the ground. In other words, the user experience-based dynamic optimization of network resources could be initiated and managed at either the network side or at remote nodes within the network.

Figure 8:
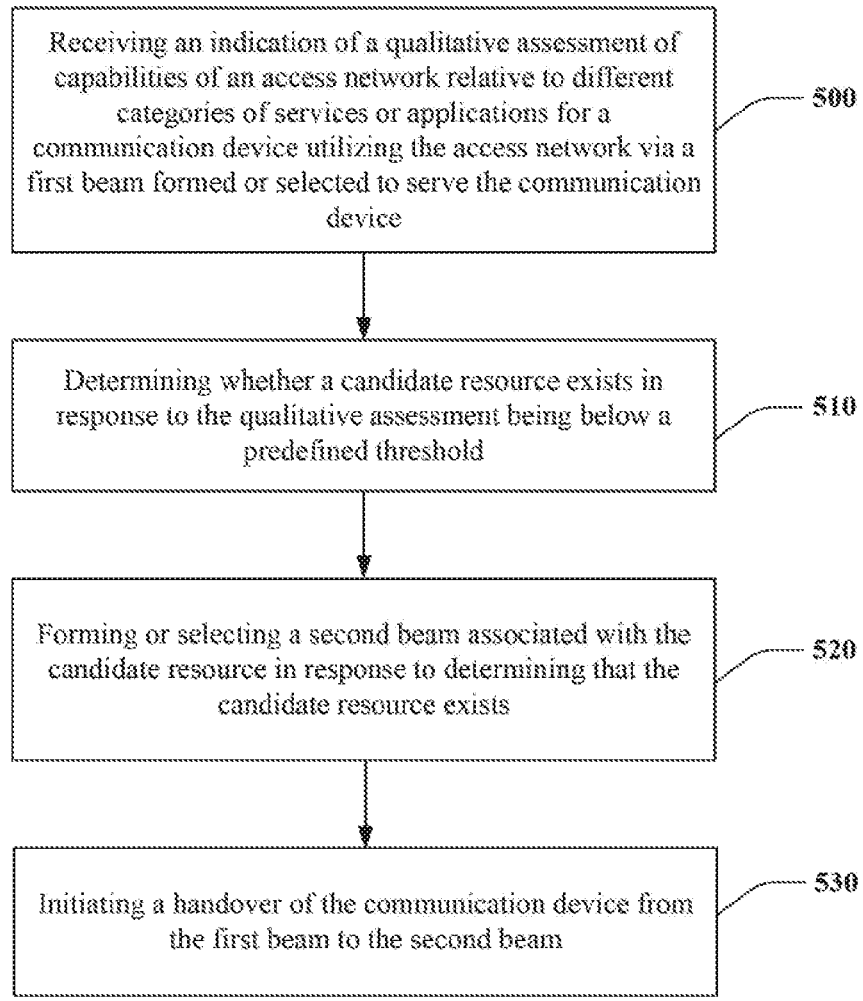
FIG. 8 illustrates a block diagram of a method of employing user experience-based handover according to an example embodiment.

As such, the systems of FIGS. 1 and 5 may provide an environment in which the test module 240 of FIG. 2 and the resource manager 400 of FIG. 4 may provide a mechanism via which a number of useful methods may be practiced. FIG. 8 illustrates a block diagram of one method that may be associated with the systems of FIGS. 1 and 5, the test module 240 of FIG. 2, and the resource manager 400 of FIG. 4. From a technical perspective, the resource manager 400 described above may be used to support some or all of the operations described in FIG. 8, and the processing circuitry similar (at least in function, but perhaps not in form) to that of FIG. 4 at the network controller 450 may support some or all of the operations of FIG. 8. As such, the platforms/components/modules described in FIGS. 1, 2, 4 and 5 may be used to facilitate the implementation of several computer program and/or network communication based interactions. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device (e.g., of the beamforming control module 430, the processing circuitry 410, or other processing circuitry) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 8, may include receiving an indication of a qualitative assessment of capabilities of an access network relative to different categories of services or applications for a communication device utilizing the access network via a first beam formed or selected to serve the communication device at operation 500. The method may further include determining whether a candidate resource exists in response to the qualitative assessment being below a predefined threshold at operation 510, forming or selecting a second beam associated with the candidate resource in response to determining that the candidate resource exists at operation 520, and initiating a handover of the communication device from the first beam to the second beam at operation 530.

In some embodiments, the method may include additional, optional operations, and/or the operations described above may be modified or augmented. Some examples of modifications, optional operations and augmentations are described below. It should be appreciated that the modifications, optional operations and augmentations may each be added alone, or they may be added cumulatively in any desirable combination. In an example embodiment, forming or selecting the second beam may include forming or selecting the second beam from a different access point than an access point from which the first beam originated. In some cases, forming or selecting the second beam may include forming or selecting the second beam from the same access point as an access point from which the first beam originated. In an example embodiment, receiving the indication further may include receiving an indication of resource contention associated with the first beam. In some cases, conducting the handover reduces resource contention on the first beam. In an example embodiment, determining whether the candidate resource exists may include determining whether the candidate resource has received a positive qualitative assessment within a predetermined period of time. In some cases, determining whether the candidate resource exists may include conducting a second qualitative assessment for the candidate resource and determining whether the second qualitative assessment is an improvement over the qualitative assessment associated with the first beam.

Accordingly, example embodiments employ an objective/quantitative series of tests and scores to then create a subjective/qualitative score or indication that is accurately representative of the user experience based on network capabilities. Thereafter, resources may be managed to optimize the user experience, and the resource management may include optimized beam forming/selection. A beneficial aspect of employing example embodiments may be that by considering the tests in combination, rather than in isolation, the interdependency of otherwise qualitative variables actually provides valuable insight into the real user experience or application experience that simple numerical results do not provide so that resource management can occur to maximize the quality of the user experience. Traditional speed tests that simply show separate numbers can give a false sense of confidence in network quality, and these tests fail to teach or explain to the lay user what the numbers mean, and why a "good" number (i.e., a fast download speed) can still result in a poor experience (e.g., web pages loading slowly or email not sending), which can be to high latency, high jitter, a slow upload speed, or some combination thereof.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A method comprising:
receiving an indication of a qualitative assessment of capabilities of an access network relative to different categories of services or applications for a communication device utilizing the access network via a first beam formed or selected to serve the communication device;

determining whether a candidate resource exists in response to the qualitative assessment being below a predefined threshold;

forming or selecting a second beam associated with the candidate resource in response to determining that the candidate resource exists; and initiating a handover of the communication device from the first beam to the second beam.

2. The method of claim 1, wherein forming or selecting the second beam comprises forming or selecting the second beam from a different access point than an access point from which the first beam originated.

3. The method of claim 1, wherein forming or selecting the second beam comprises forming or selecting the second beam from the same access point as an access point from which the first beam originated.

4. The method of claim 1, wherein the receiving the indication further comprises receiving an indication of resource contention associated with the first beam.

5. The method of claim 4, wherein conducting the handover reduces resource contention on the first beam.

6. The method of claim 1, wherein determining whether the candidate resource exists comprises determining whether the candidate resource has received a positive qualitative assessment within a predetermined period of time.

7. The method of claim 1, wherein determining whether the candidate resource exists comprises conducting a second qualitative assessment for the candidate resource and determining whether the second qualitative assessment is an improvement over the qualitative assessment associated with the first beam.

8. A resource manager comprising a processing circuitry configured to:

receive an indication of a qualitative assessment of capabilities of an access network relative to different categories of services or applications for a communication device utilizing the access network via a first beam formed or selected to serve the communication device;

determine whether a candidate resource exists in response to the qualitative assessment being below a predefined threshold;

form or select a second beam associated with the candidate resource in response to determining that the candidate resource exists; and initiate a handover of the communication device from the first beam to the second beam.

9. The resource manager of claim 8, wherein the processing circuitry is configured to form or select the second beam by forming or selecting the second beam from a different access point than an access point from which the first beam originated.

10. The resource manager of claim 8, wherein the processing circuitry is configured to form or select the second beam by forming or selecting the second beam from the same access point as an access point from which the first beam originated.

11. The resource manager of claim 8, wherein the receiving the indication further comprises receiving an indication of resource contention associated with the first beam.

12. The resource manager of claim 11, wherein conducting the handover reduces resource contention on the first beam.

13. The resource manager of claim 8, wherein the processing circuitry is configured to determine whether the candidate resource exists by determining whether the candidate resource has received a positive qualitative assessment within a predetermined period of time.

14. The resource manager of claim 8, wherein the processing circuitry is configured to determine whether the candidate resource exists by conducting a second qualitative assessment for the candidate resource and determining whether the second qualitative assessment is an improvement over the qualitative assessment associated with the first beam.

15. A system comprising;

an access network comprising at least two base stations configured to communicate with a wireless communication device via dynamically steerable or formable beams;

a resource manager disposed at a location accessible via the access network or at the wireless communication device; and an experience tester configured to determine a qualitative assessment of capabilities of the access network relative to different categories of services or applications for the wireless communication device via a first beam formed or selected to serve the communication device, wherein the resource manager is configured to initiate a handover based on both location-based criteria and user experience based criteria, the user experience based criteria being associated with the qualitative assessment.

16. The system of claim 15, wherein the resource manager is configured to:

receive an indication of the qualitative assessment;

determine whether a candidate resource exists in response to the qualitative assessment being below a predefined threshold;

form or select a second beam associated with the candidate resource in response to determining that the candidate resource exists for initiation of the handover from the first beam to the second beam.

17. The system of claim 15, wherein forming or selecting the second beam comprises forming or selecting the second beam from a different base station than an base station from which the first beam originated.

18. The system of claim 15, wherein forming or selecting the second beam comprises forming or selecting the second beam from the same base station as a base station from which the first beam originated.

19. The system of claim 15, wherein determining whether the candidate resource exists comprises determining whether the candidate resource has received a positive qualitative assessment within a predetermined period of time.

20. The system of claim 15, wherein determining whether the candidate resource exists comprises conducting a second qualitative assessment for the candidate resource and determining whether the second qualitative assessment is an improvement over the qualitative assessment associated with the first beam.

* * * * *